(12) United States Patent
Wright et al.

(10) Patent No.: US 6,249,983 B1
(45) Date of Patent: Jun. 26, 2001

(54) LEVELLING APPARATUS FOR A LASER LEVEL

(75) Inventors: Randall J. Wright, Hartland; Joseph B. Coel, Waterford, both of WI (US)

(73) Assignee: Empire Level Mfg. Corp., Milwaukee, WI (US)

(*) Notice: Subject to any disclaimer, the term of this patent is extended or adjusted under 35 U.S.C. 154(b) by 0 days.

(21) Appl. No.: 09/238,771

(22) Filed: Jan. 28, 1999

Related U.S. Application Data (63) Continuation-in-part of application No. 09/134,685, filed on Aug. 14, 1998.

(51) Int. Cl.[7] .................................................. G01C 5/00
(52) U.S. Cl. ...................................... 33/286; 33/290
(58) Field of Search ........................... 33/281, 282, 283, 33/286, 333, 370, 371, 568, 573, DIG. 21, 290, 291; 403/122, 130

(56) References Cited

U.S. PATENT DOCUMENTS

| | | | |
|---|---|---|---|
| 368,308 | 8/1887 | Richardson | 33/285 |
| 381,243 * | 4/1888 | Holmes | 33/290 |
| 494,876 | 4/1893 | Merrill | 33/290 |
| 701,612 * | 6/1902 | Prier | 33/291 |
| 753,149 | 2/1904 | Lankford | 33/285 |
| 784,511 * | 3/1905 | Belyeu | 33/291 |
| 925,058 * | 6/1909 | Wain | 33/291 |
| 1,151,549 | 8/1915 | Schade | 248/180.1 |
| 2,308,206 | 1/1943 | Poland | 33/290 |
| 2,459,626 | 1/1949 | Coutant et al. | 248/126 |
| 2,571,287 * | 10/1951 | Peters | 33/291 |
| 3,830,580 * | 8/1974 | Slattery et al. | 403/122 |
| 4,035,084 * | 7/1977 | Ramsay | 33/291 |
| 4,060,331 * | 11/1977 | Domer et al. | 403/122 |
| 4,225,261 * | 9/1980 | Marx | 403/122 |
| 4,579,436 | 4/1986 | Jaumann | 248/163.1 |
| 5,575,073 | 11/1996 | Wedemayer | 33/365 |
| 5,604,987 * | 2/1997 | Cupp | 33/275 R |
| 5,771,597 * | 6/1998 | Hopf | 33/474 |
| 5,921,698 * | 7/1999 | Hegen et al. | 403/122 |
| 6,017,010 * | 1/2000 | Cui | 248/288.31 |

* cited by examiner

*Primary Examiner*—G. Bradley Bennett
(74) *Attorney, Agent, or Firm*—Jansson, Shupe & Munger, Ltd.

(57) ABSTRACT

A levelling apparatus for a laser level includes a base having a central axis and a sphere-shaped socket component mounted to the base. A sphere-shaped ball device is received in the socket component for relative movement with respect thereto. A retention mechanism is spaced radially outwardly from the central axis and includes first and second locking members in overlapping relationship to one another, thereby retaining the ball device in the socket component. In a second embodiment of the levelling apparatus, the sphere-shaped ball device is mounted to the base and the sphere-shaped socket component mounted to the ball device for relative movement with respect thereto. The retention mechanism is in registry with the central axis and includes first and second locking members in overlapping relationship to one another, thereby retaining the socket component to the ball device. Other embodiments are also disclosed.

10 Claims, 9 Drawing Sheets

LEVELLING APPARATUS FOR A LASER LEVEL

RELATED APPLICATION

This application is a continuation-in-part of co-pending application Ser. No. 09/134,685 filed Aug. 14, 1998, titled LEVELLING APPARATUS FOR A BUILDER'S LASER LEVEL.

FIELD OF THE INVENTION

This invention relates generally to supports and, more particularly, to supports of the type having a platform for mounting a geometric instrument, e.g., a laser level.

BACKGROUND OF THE INVENTION

Builder's spirit levels have been in wide use for decades, perhaps centuries, for establishing reference lines and planes used during construction of roads, buildings, sidewalks and the like. A more recent innovation is a laser level which includes spirit vials for levelling and which also includes a laser light source for "spotting" a remote reference point upon a structure.

Equally common are the tripods upon which such levels are supported and examples of earlier tripods and levels are disclosed in U.S. Pat. No. 494,876 (Merrill), U.S. Pat. No. 753,149 (Lankford), U.S. Pat. No. 1,151,549 (Schade) and U.S. Pat. No. 2,308,206 (Poland). One of the features of the tripods shown in the Lankford and Schade patents is a levelling screw arrangement.

More recently developed tripods used by professional engineers and builders have a number of additional features not disclosed in the Merrill, Lankford, Schade and Poland patents. And while such features make the tripod easier to use and more accurate in use, the cost of such professional tripods has risen accordingly. In a modern, professional tripod, the levelling screw platform and related hardware is, itself, a rather costly component of the tripod.

A professional engineer or builder can justify the expense of such a tripod—after all, the tripod is an important tool of the profession and is subjected to use, perhaps hard use, daily or nearly so. But a homeowner/builder who might use a tripod only infrequently to, e.g., lay a sidewalk, build a shed or the like, has great difficulty justifying the expense of a professional-class tripod.

And that is not the only reason why a professional-class tripod might not be appropriate for the casual user. Another reason relates to ease (or, conversely, complexity) of operation. Modern professional-class tripods have a number of parts, including adjustment-related parts which, while contributing to the absolute accuracy required by a professional, may be baffling to the uninitiated user.

In view of the invention, it is neither necessary nor desirable for the casual homeowner/builder to employ a professional-quality tripod or, for that matter, to employ any tripod at all.

OBJECTS OF THE INVENTION

It is an object of the invention to provide a new levelling apparatus, often referred to in the trade as a "levelling base," which overcomes some of the problems and shortcomings of the prior art.

Another object of the invention is to provide a new levelling apparatus which is easy for a casual homeowner/builder to use.

Another object of the invention is to provide a new levelling apparatus which is low in cost.

Still another object of the invention is to provide a new levelling apparatus which is compatible with commonly-available camera tripods.

Another object of the invention is to provide a new levelling apparatus which is useful alone, i.e., without a tripod of any type.

Another object of the invention is to provide a new levelling apparatus which is freely adjustable without the use of levelling screws or the like.

Yet another object of the invention is to provide a new levelling apparatus which, in a particular embodiment, provides three degrees of freedom of movement of a level mounted thereon. How these and other objects are accomplished will become apparent from the following descriptions and from the drawings.

SUMMARY OF THE INVENTION

The invention involves a levelling apparatus for a laser level, e.g., a combined spirit and laser level. The apparatus is low in cost and suitable for purchase and use by the home craftsman.

Such apparatus includes a substantially flat, disc-like base having a central axis generally perpendicular to such base. A cup-like, sphere-shaped socket component is mounted to the base and, more particularly, is mounted atop the base.

A sphere-shaped ball device, nominally a half-sphere, is received in the socket component for relative movement with respect thereto. The ball device, which supports the level, and the socket component are held in sliding contact with one another solely by the weight of the level and ball device bearing downwardly against the socket component. In this configuration, the levelling apparatus permits up-down and rotational movement of the level mounted thereon, as described in more detail below.

While the levelling apparatus is fully functional with the components described above, there is some risk of physical damage to the level mounted thereon. Whether or not the apparatus is supported only on its base or whether the base is supported atop a tripod, the ball device (to which the level is secured) can be freely removed from (or can easily fall out of) the socket component if the apparatus or its supporting tripod are inadvertently bumped or tipped over.

To the end of helping to prevent damage to the level, the highly preferred apparatus includes a retention mechanism having first and second locking members in overlapping relationship to one another, thereby retaining the ball device in the socket component. In one embodiment, the retention mechanism is spaced radially outwardly from the central axis and has a first locking member with a lip extending radially outwardly from the socket component. The second locking member includes a hook overlapping the lip and, most preferably, includes a plurality of hooks overlapping the lip.

In a specific embodiment, there are three hooks spaced 120° apart. Such hooks are somewhat flexible and extend outwardly and downwardly from the ball device, terminate below the lip and overlap the lip so that the socket component and the ball device cannot be separated from one another without flexing the hooks outwardly, thereby releasing them from the lip.

In another aspect of the invention, the socket component is fixed with respect to the base (by, e.g., sonic welding) so that the socket component and base cannot rotate or otherwise move with respect to one another. The socket component has an inner surface which is spherical over 360°. To state it another way, all points on the inner surface which are coincident with a plane perpendicular to the base-and-component central axis are at the same distance from such axis.

Similarly, the ball device includes an outer surface spherical over 360° and contacting the inner surface of the socket component, thereby permitting the ball device to pivot in any direction with respect to the socket component. To state that relationship another way, the ball device can be moved in such a way that a ball device concentric axis can circumscribe a circle on the plane mentioned above and can intersect such plane anywhere within the circle.

A specific embodiment of a ball device includes structure for aiding positional retention of the ball device and the laser level with respect to one another. In this embodiment, the ball device has an upper rim with a notch formed in it. The laser level includes a lower support or rail which is received in the notch with close fit.

There is some possibility that the embodiment of the apparatus which permits the ball device to pivot in any direction with respect to the socket component might be a bit unstable for some homeowner/users of the apparatus. In another embodiment, the apparatus includes a guide mechanism spaced radially outwardly from the central axis. Such guide mechanism has first and second guide members in overlapping relationship, thereby permitting only one degree of freedom of movement of the ball device with respect to the socket component.

In one, more-specific embodiment, the first guide member includes an arcuate groove in the socket component and the second guide member includes a tongue on the ball device and projecting into the groove. In another, similar embodiment (which might be termed an "inside out" version of the embodiment described immediately above), the second guide member includes a groove in the ball device and the first guide member includes a tongue on the socket component and projecting into the groove. In either embodiment involving the tongue-in-groove arrangement, the ball device has only one degree of freedom of movement with respect to the socket component. To state the ball device/socket component relationship in more geometric terms, when the ball device is moved with respect to the socket component, a device concentric axis can "sweep" or define only a plane.

However, given the fact that the socket component is movable with respect to the base permits the supported level to have, in one embodiment, three degrees of freedom of movement. To state this latter relationship another way, the ball device can be moved in such a way that a ball device concentric axis can circumscribe a circle on the plane mentioned above and can intersect such plane anywhere within the circle. This second embodiment may also have a notch in the upper rim of the ball device and a laser level rail received in such notch for positional retention.

Yet another embodiment of a levelling apparatus for a laser level includes the base having its central axis, a sphere-shaped ball device mounted to the base, and a sphere-shaped socket component mounted to the ball device for relative movement with respect thereto. The retention mechanism is in registry with the central axis and includes first and second locking members in overlapping relationship to one another, thereby retaining the socket component to the ball device.

In more specific aspects of this embodiment, the first locking member includes a ball fixed with respect to the socket component and the second locking member includes a releasable clamping ring overlapping the ball. Most preferably, the socket component includes an axis and the first locking member includes a post fixed on the socket component, extending along the axis and having a distal end. The ball is affixed to such distal end.

In another aspect of this embodiment, the clamping ring is a split ring and does not extend entirely around the ball. And the split ring has a paddle-like tang extending away from it.

The retention mechanism includes a lever mounted for pivoting movement with respect to the base and about an axis offset from and parallel to the base axis. Such lever has a bearing surface against the tang, thereby closing the clamping ring snugly against the ball when the lever is pivoted in a ring-closing direction. (Of course, when the lever is pivoted in a ring-opening direction, the ring is released from the ball and with a little urging, the ball can be withdrawn from the ring.) With this arrangement, the ball device is prevented from separating from the socket component (if the apparatus or its tripod are tipped, for example) and the ball device may be positionally fixed with respect to such socket component.

The second embodiment might be termed an "upside down" version of the first embodiment. In the second embodiment, the ball device includes an outer surface spherical over 360°. The socket component includes an inner surface spherical over 360° and contacting the outer surface of the ball device, thereby permitting the ball device to pivot in any direction with respect to the socket component.

A third embodiment, resembling the second embodiment, has a socket component with a central axis and an attachment pocket coincident with such axis. Such pocket receives a stud or other fastener which permits the levelling apparatus and the laser level to be securely attached to one another. The socket component also includes an annular bearing surface spaced radially well outwardly of the attachment pocket. Such bearing surface and the level contact one another when the level is mounted to the apparatus.

To help assure that the level is against the outward bearing surface rather than against the upper boundary of the attachment pocket, such boundary is slightly below the bearing surface. In geometric terms, the attachment pocket has a boundary coincident with a pocket plane and the level-contacting bearing surface is coincident with a bearing plane. The planes are spaced slightly from one another and, more specifically, the pocket plane is below the bearing plane.

A preferred levelling apparatus is molded from plastic material and is engineered to reduce the amount of such material that might otherwise be used in the molding process while yet providing the requisite support strength. Accordingly, the base of the levelling apparatus includes an underside having a plurality of ribs and a plurality of between-rib cavities. This feature can be incorporated in any of the embodiments described herein.

It is also preferable that the socket component and the ball device be cooperatively configured to permit the socket component to tilt at some limited, maximum angle of tilt with respect to the ball device. To that end, the ball device includes a lip around the attachment pocket. When the axis of the socket component is coincident with that of the ball device, the lip is uniformly radially spaced from the attachment pocket and is concentric with it. And at the maximum angle of tilt, the attachment pocket contacts the lip.

Further aspects of the invention are set forth in the following detailed description and in the drawings.

DETAILED DESCRIPTION OF PREFERRED EMBODIMENTS

Before describing the new apparatus 10, it will be helpful to have an understanding of but one type of laser level with which the apparatus 10 can be used. Referring to FIGS. 1 through 4, an exemplary level 11, about 10 inches in length, includes two spirit level vials 13, 15 and a laser light source 17, all mounted in the level body 19. The body 19 includes a lower rail 21 and a drilled, tapped hole 23 in such rail 21, the purposes of both of which are described below.

Figures 1, 2:
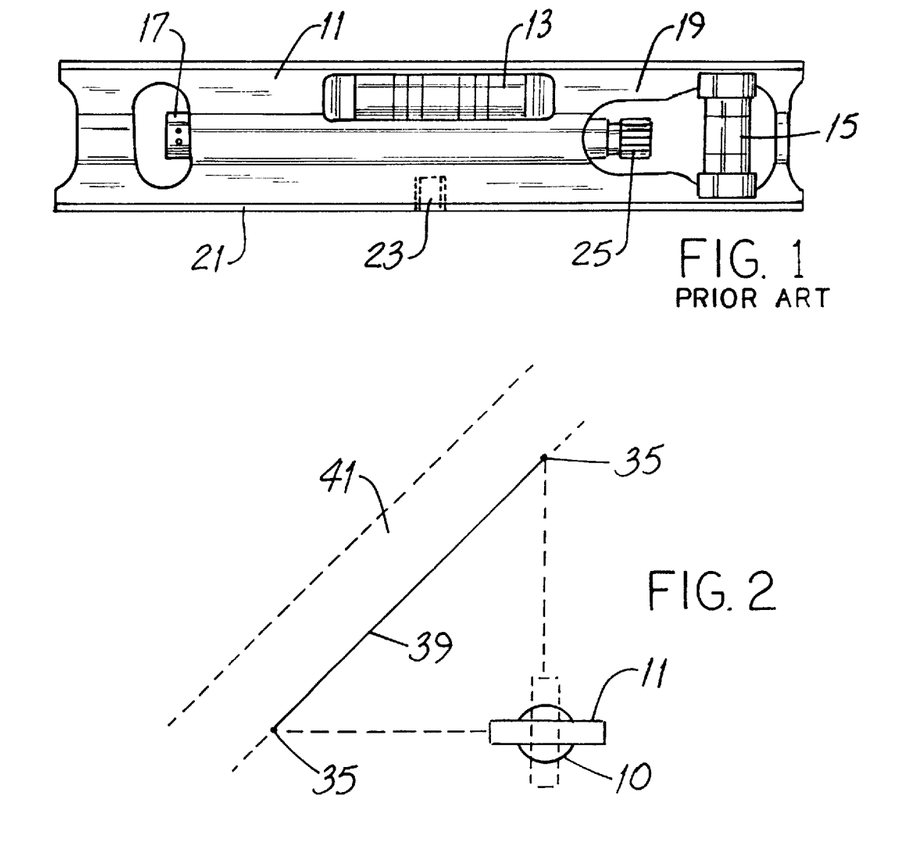
FIG. 1 is a side elevation view of a known type of laser level.
FIG. 2 is a representative top plan view illustrating how the level of FIG. 1 can be used with the inventive apparatus for construction purposes.

When the switch 25 is rotated to the "on" position, the source 17 emits a laser beam 27. Such beam 27 is horizontal when the vial 13 indicates that the body 19 and its lower rail 21 are horizontal or is vertical when the vial 15 indicates that the body 19 and its lower rail 21 are vertical. An exemplary way in which the level 11 and its laser beam 27 are used are described below.

Figure 3:
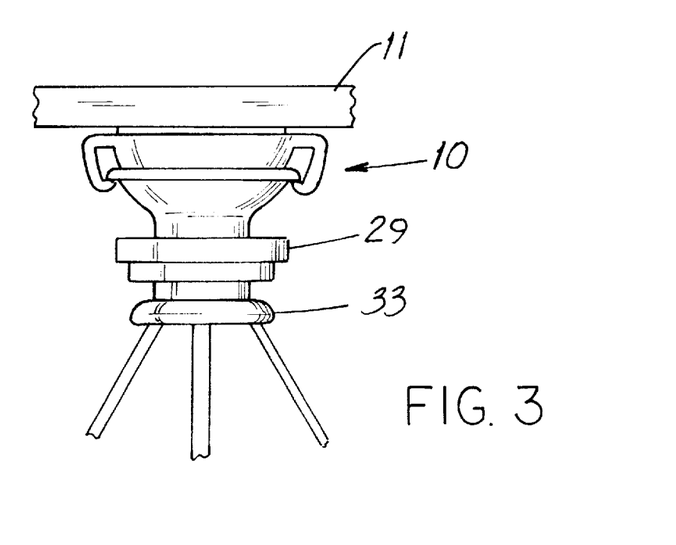
FIG. 3 is a representative side elevation view of the level of FIG. 1 mounted to the inventive apparatus which, in turn, is mounted to a conventional tripod. Parts are broken away.
Figure 4:
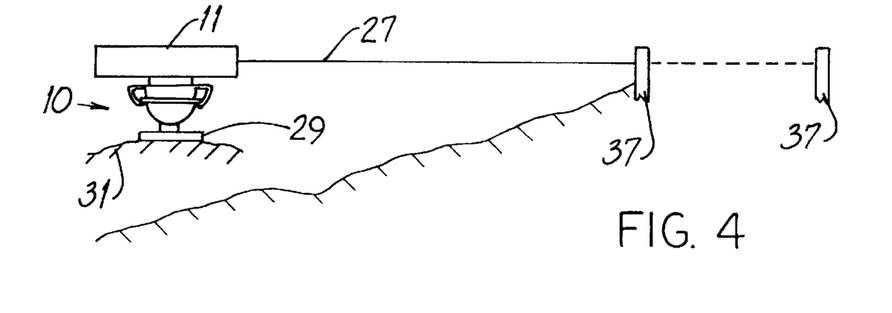
FIG. 4 is a representative side elevation view, partly in section, illustrating how the level of FIG. 1 can be used with the inventive apparatus for construction purposes.

Merely as one example of the way in which the apparatus 10 is used, FIGS. 2, 3 and 4 show a level 11 attached to the apparatus 10. The base 29 is resting atop the earth 31 or atop some other support, e.g., a tripod 33, support platform or the like. The level 11 is manipulated as described above to establish two reference points 35 marked on stakes 37 or the like. A string line 39 between the points 35 is horizontal and establishes a reference in order to dig a shallow trench, lay gravel in the trench and pour and smooth concrete over the gravel, all to form a residential sidewalk 41. (It is apparent from the foregoing that given the fact that apparatus 10 can be used alone, i.e., without a tripod 33, the level 11 can be positioned at an elevation such that the reference points 35 are about coincident with the surface of the proposed sidewalk 41. Such positioning may not be possible when using a tall, conventional tripod 33 of any type.)

Figure 5:
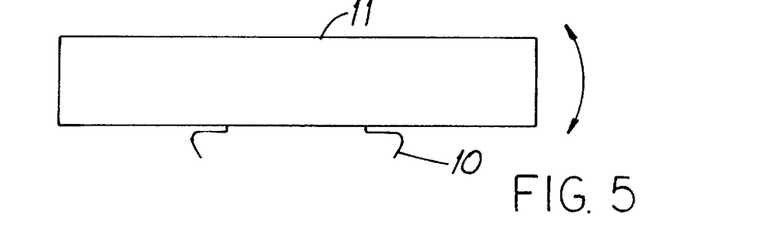
FIGS. 5, 6 and 7 are representative side elevation, end elevation and top plan views, respectively, illustrating how an embodiment of the inventive apparatus provides three degrees of freedom of movement of the level.
Figure 6:
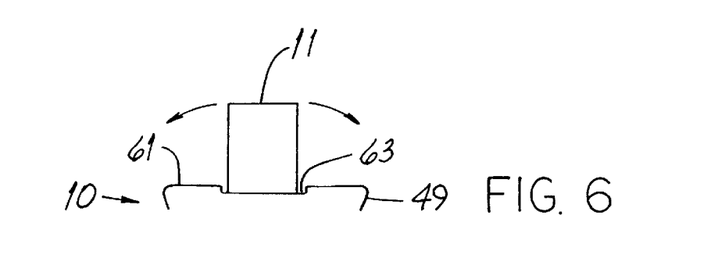
Figure 7:
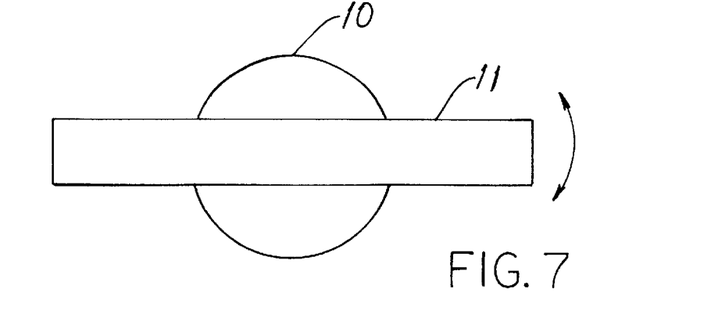
Figure 8:
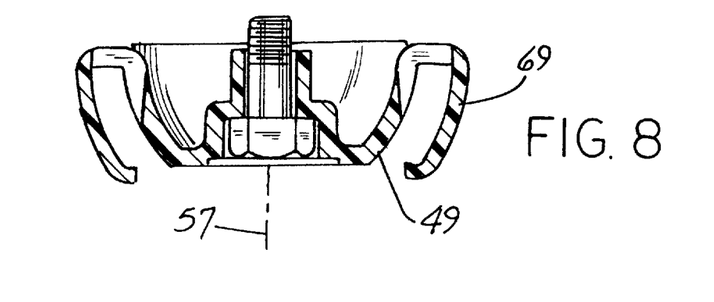
FIG. 8 is an elevation view, partly in section and partly in full representation, of an embodiment of the ball device of the new apparatus.

Considering FIGS. 5, 6 and 7, when used with the apparatus 10, the level 11 may be said to have three degrees of freedom of movement. Up/down movement is represented by FIG. 5, canting or tipping left/right is represented by FIG. 6 and/or rotating clockwise/counterclockwise is represented by FIG. 7. (It is to be appreciated that canting or tipping movement is generally considered disadvantageous and for this reason, an embodiment lacking the guide mechanism is less preferred.)

Details of the new apparatus 10 will now be set forth. Referring also to FIGS. 8 through 15 the apparatus 10 includes a substantially flat, disc-like base 43 having a central axis 45 generally perpendicular to such base 43. A cup-like, sphere-shaped socket component 47 is mounted to the base 43 and, more particularly, is mounted atop the base 43. In this embodiment, the component 47 is affixed to the base 43 to prevent relative movement between the socket component 47 and the base 43.

A sphere-shaped ball device 49, nominally a half-sphere, is received in the socket component 47 for relative movement with respect thereto. The ball device 49, which supports the level 11, and the socket component 47 are held in sliding contact with one solely by the weight of the level 11 and ball device 49 bearing downwardly against the socket component 47.

Figure 9:
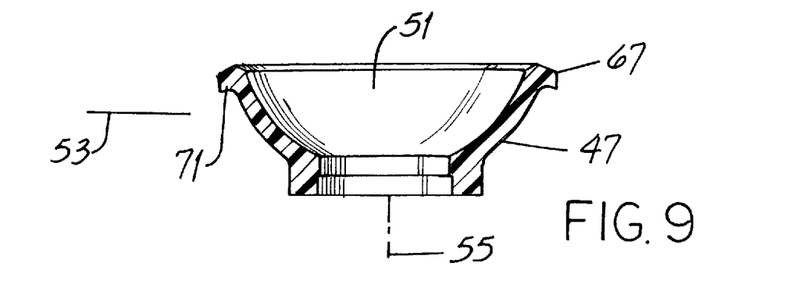
FIG. 9 is a sectional elevation view of an embodiment of the socket component of the new apparatus.
Figure 10:
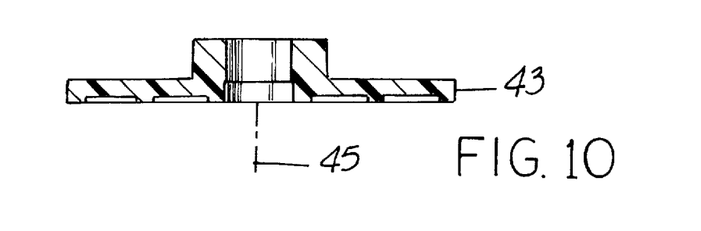
FIG. 10 is a sectional elevation view of an embodiment of the base of the new apparatus.
Figure 11:
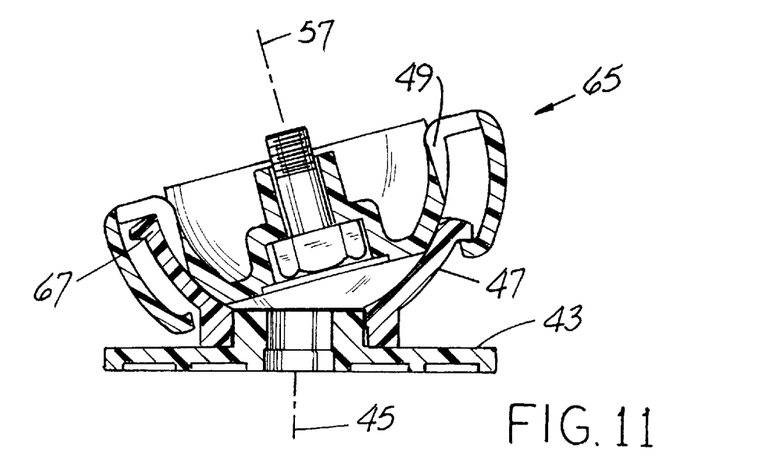
FIG. 11 is a sectional elevation view of the apparatus with the base, socket component and ball device assembled to one another. The level-retaining hex head bolt is in full representation.

Describing other aspects of the component 47 and device 49, the socket component 47 has an inner surface 51 which is spherical over 360°. To state it another way, all points on the inner surface 51 which are coincident with a plane 53 perpendicular to the component central axis 55 are at the same distance from such axis 55.

Figure 16:
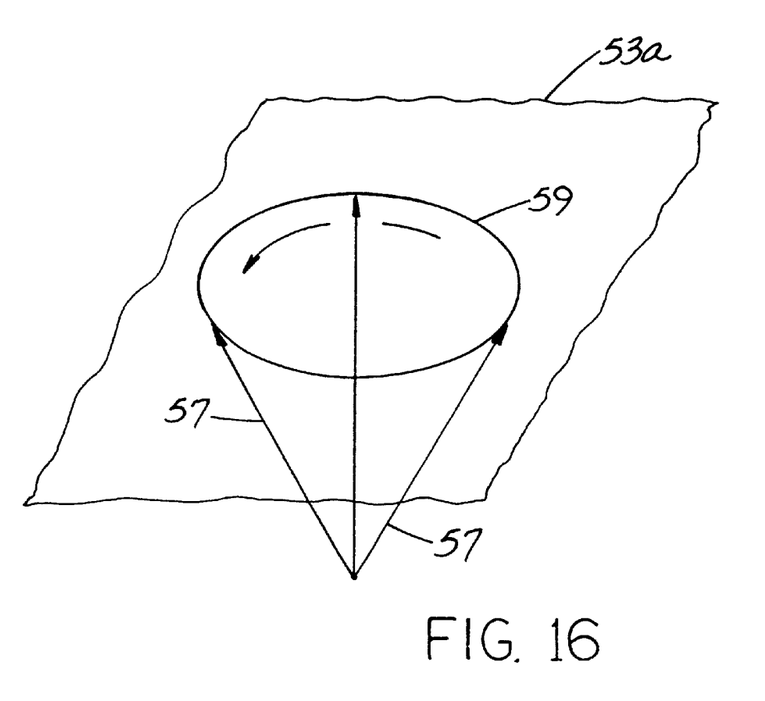
FIG. 16 is a spatial geometric representation used in connection with descriptions in the specification.
Figure 17:
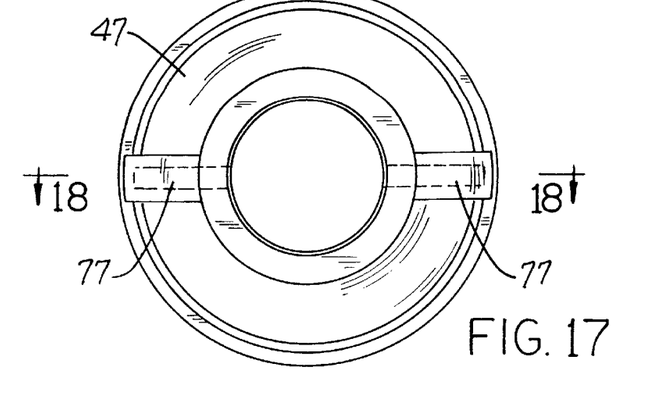
FIG. 17 is a top plan view of another embodiment of the socket component of the apparatus.
Figure 18:
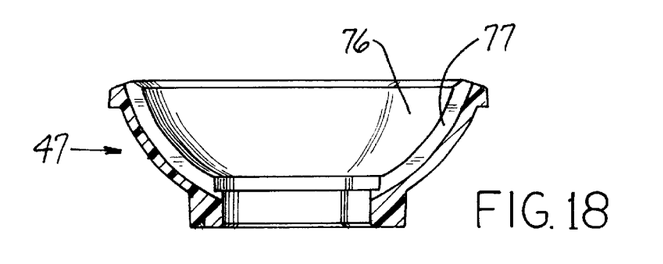
FIG. 18 is a sectional view of the socket component of FIG. 17 taken along the viewing plane 18—18 thereof.
Figure 19:
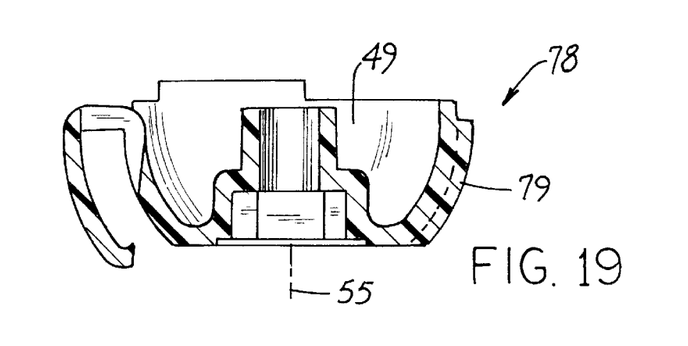
FIG. 19 is a sectional view of another embodiment of the ball device of the apparatus.
Figure 20:
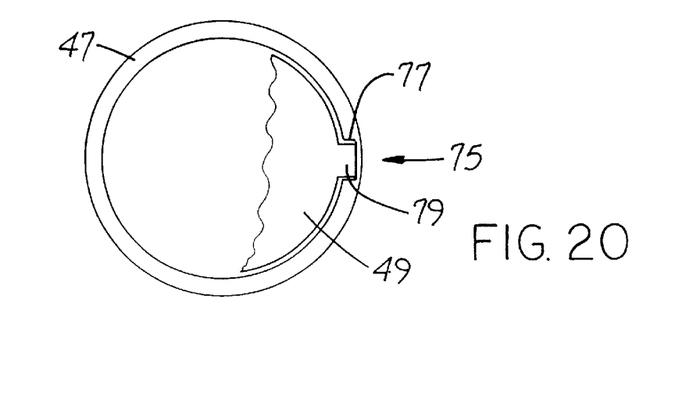
FIG. 20 is a simplified top plan view showing a guide mechanism used in one embodiment of the apparatus.

Similarly, the ball device 49 includes an outer surface spherical over 360° and contacting the inner surface 51 of the socket component 47, thereby permitting the ball device 49 to pivot in any direction with respect to the socket component 47. To state that relationship another way and considering FIG. 16, the ball device 49 can be moved in such a way that a ball device 49 concentric axis 57 can circumscribe a circle 59 on a plane 53a parallel to plane 53 and can intersect such plane 53a anywhere within the circle 59.

Referring now to FIGS. 6, 11 through 15, a specific embodiment of a ball device 49 includes structure for aiding positional retention of the ball device 49 and the laser level 11 with respect to one another. In this embodiment, the ball device 49 has an upper rim 61 with a notch 63 formed in it. The laser level 11 includes the lower support or rail 21 which is received in the notch 63 with close fit.

Figure 12:
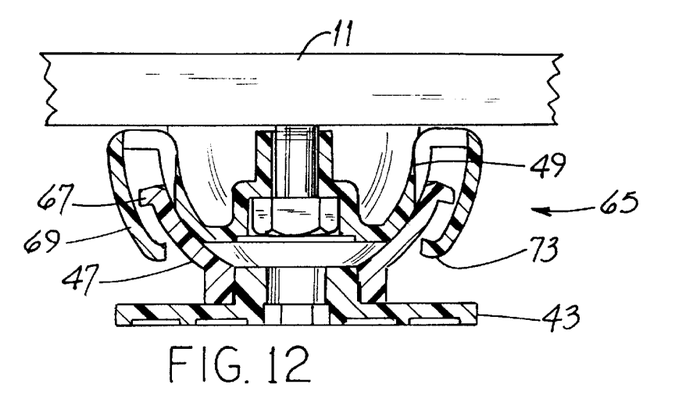
FIG. 12 is a view generally like FIG. 11 and including the level mounted on the apparatus. Parts are broken away.
Figure 13:
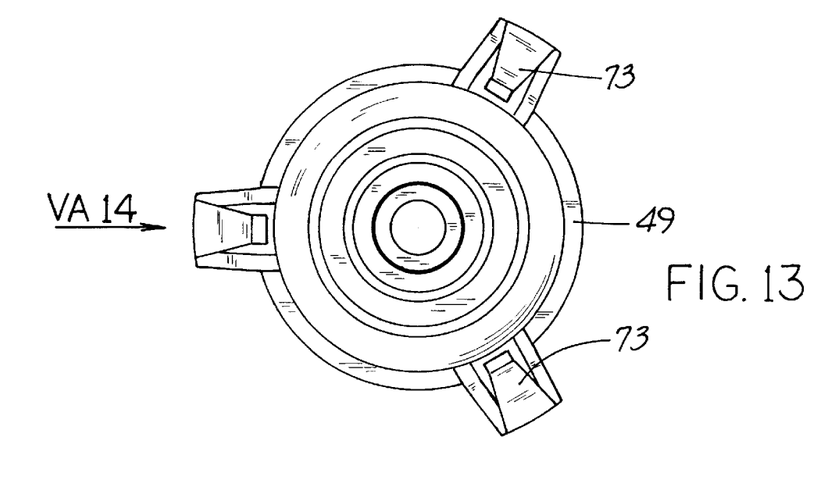
FIG. 13 is a bottom plan view of the ball device shown in FIG. 12.
Figure 14:
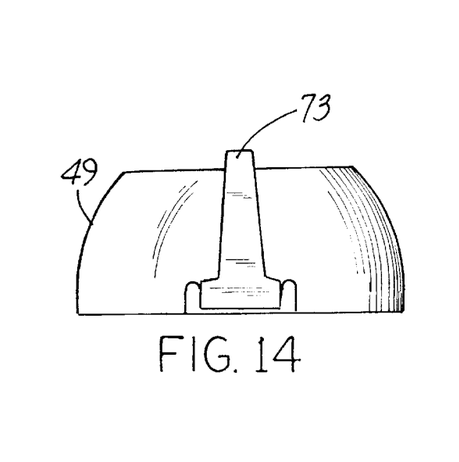
FIG. 14 is an elevation view of the ball device shown in FIG. 13 taken along the viewing axis VA14.
Figure 15:
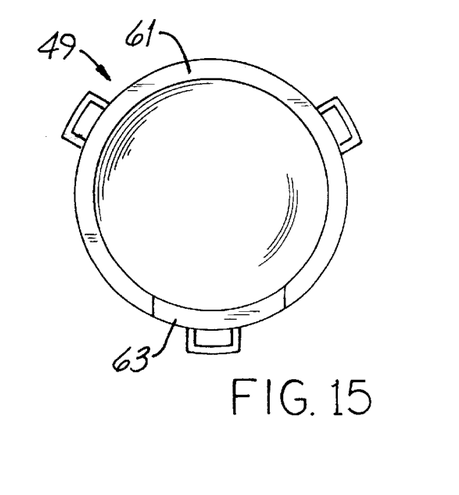
FIG. 15 is a top plan view of the ball device of FIGS. 13 and 14 showing the rail retaining notch formed therein.

While the levelling apparatus 10 is fully functional with the components described above, there is some risk of physical damage to the level 11 mounted thereon. Whether or not the apparatus 10 is supported only on its base 43 or whether the base 43 is supported atop a tripod 33, the ball device 49 (to which the level 11 is secured) can be freely removed from (or can easily fall out of) the socket component 47 if the apparatus 10 (with or without a supporting tripod 33) is tipped over.

To the end of helping to prevent damage to the level 11, the highly preferred apparatus 10 includes a retention mechanism 65 having first and second locking members 67, 69, respectively, in overlapping relationship to one another, thereby retaining the ball device 49 on the socket component 47. In one embodiment, the retention mechanism 65 is spaced radially outwardly from the central axis 45 and has a first locking member 67 with a lip 71 extending radially outwardly from the socket component 47. The second locking member 69 includes a hook 73 overlapping the lip 71 and, most preferably, includes a plurality of hooks 73 overlapping the lip 71.

In a specific embodiment, there are three hooks 73 spaced 120° apart. Such hooks 73 are somewhat flexible and extend outwardly and downwardly from the ball device 49, terminate below the lip 71 and overlap the lip 71 so that the socket component 47 and the ball device 49 cannot be separated from one another without flexing the hooks 73 outwardly, thereby releasing them from the lip 71.

Referring now to FIGS. 17 through 20, there is some possibility that the embodiment of the apparatus shown in FIGS. 11 and 12, which permits the ball device 49 to pivot in any direction with respect to the socket component 47 might be a bit unstable for some homeowner/users of the apparatus 10. In another embodiment, the apparatus 10 includes a guide mechanism 75 spaced radially outwardly from the central axis 55. Such guide mechanism 75 has first and second guide members 77, 79, respectively, in overlapping relationship, thereby permitting only one degree of freedom of movement of the ball device 49 with respect to the socket component 47.

In a preferred embodiment, the first guide member 76 is an arcuate groove 77 in the socket component 47 and the second guide member 78 includes a tongue 79 on the ball device 49 and projecting into the groove 77. (Another, similar embodiment which might be termed an "inside out" version, the second guide member 78 includes a groove 77 in the ball device 49 and the first guide member 76 includes a tongue 79 on the socket component 47 and projecting into the groove 77.)

In either embodiment involving the tongue-in-groove arrangement, the ball device 49 has only one degree of freedom of movement with respect to the socket component 47. To state that ball device/socket component relationship in more geometric terms, when the ball device 49 is moved with respect to the socket component 47, a device concentric axis 57 can "sweep" or define only a plane.

However, given the fact that in this embodiment the socket component 47 is movable with respect to the base 43 permits the supported level 11 to have three degrees of freedom of movement. To state this latter relationship another way, the ball device 49 can be moved in such a way that a ball device concentric axis 55 can circumscribe a circle 59 on the plane 53a mentioned above and can intersect such plane 53a anywhere within the circle 59. This second embodiment may also have a notch 63 in the upper rim 61 of the ball device 49 and a laser level rail 21 received in such notch 63 for positional retention.

Figure 21:
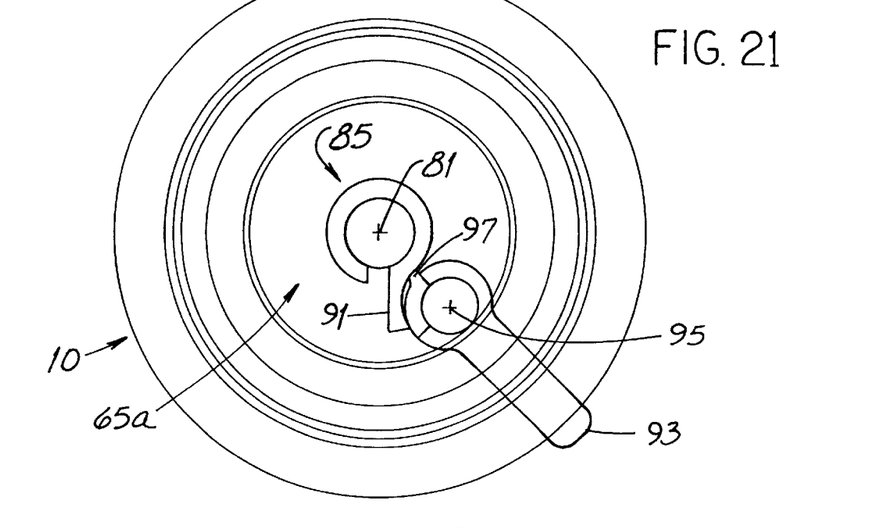
FIG. 21 is a phantom top plan view showing yet another embodiment of the invention.
Figure 22:
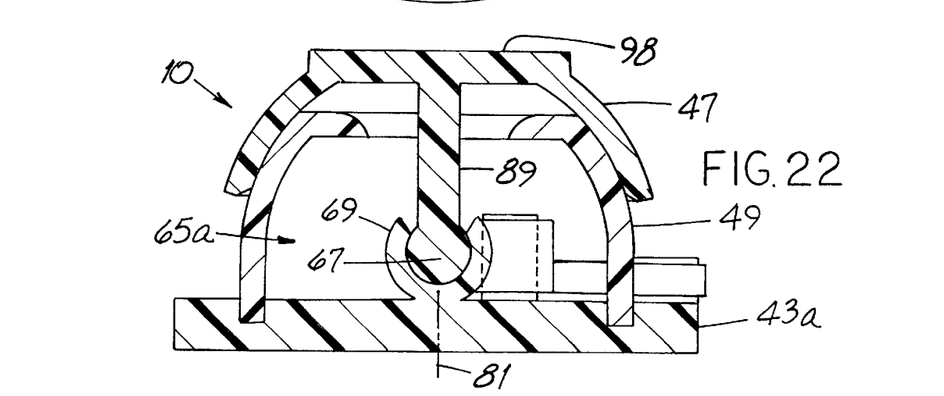
FIG. 22 is a side elevation view, partly in section and partly in full representation, of the embodiment of FIG. 21.
Figure 23:
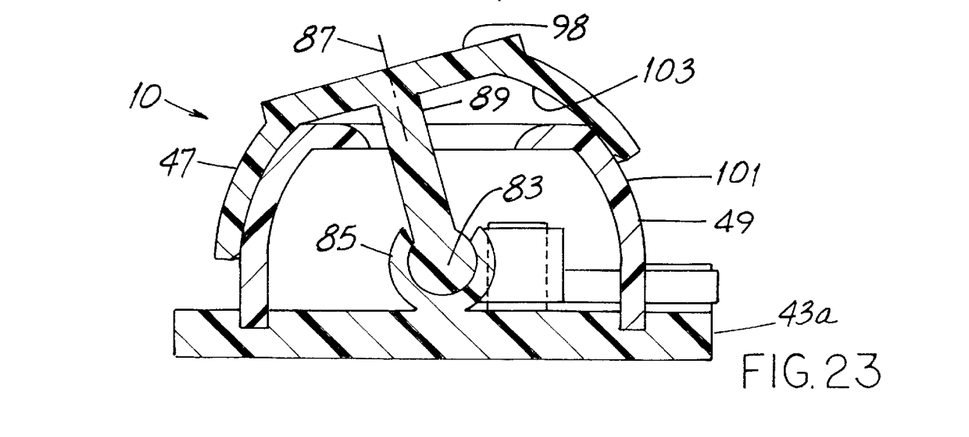
FIG. 23 is another side elevation view, partly in section and partly in full representation, of the embodiment of FIG. 21.

Referring now to FIGS. 21, 22 and 23 yet another embodiment of a levelling apparatus 10 for a laser level 11 includes the base 43a having its central axis 81, a sphere-shaped ball device 49 mounted to the base 43a, and a sphere-shaped socket 47 component mounted to the ball device 49 for relative movement with respect thereto. The retention mechanism 65a is in registry with the central axis 81 and includes first and second locking members 67, 69, respectively, which are in overlapping relationship to one another, thereby retaining the socket component 47 to the ball device 49.

In more specific aspects of this embodiment, the first locking member 67 includes a ball 83 fixed with respect to the socket component 47 and the second locking member 69 includes a releasable clamping ring 85 overlapping the ball 83. Most preferably, the socket component 47 includes an axis 87 and the first locking member 67 includes a post 89 fixed on the socket component 47, extending along the axis 87 and having the ball 83 affixed to the post distal end.

In another aspect of this embodiment, the clamping ring 85 is a split ring and does not extend entirely around the ball 83. And the split ring 85 has a paddle-like tang 91 extending away from it.

The retention mechanism includes a lever 93 mounted for pivoting movement with respect: to the base 43a and about an axis 95 offset from and parallel to the base axis 81. Such lever 93 has a bearing surface 97 against the tang 91, thereby closing the clamping ring 85 radially inwardly snugly against the ball 83 when the lever 93 is pivoted in a ring-closing direction, i.e., counterclockwise in the view of FIG. 21. The level 11 rests atop the surface 98 of the component 47. (Of course, when the lever 93 is pivoted in a ring-opening direction, the ring 85 is released radially outwardly from the ball 83. With a little urging—the ring 85 is slightly flexible—the ball 83 can be withdrawn from the ring 85.) With this arrangement, the socket component 47 and the ball device 49 are prevented from easily separating from one another if the apparatus or its tripod are tipped, for example. And the ball device 49 may be positionally fixed with respect to such socket component 47.

The third embodiment of FIGS. 21, 22 and 23, might be termed an "upside down" version of the first embodiment. In the third embodiment, the ball device 49 includes an outer surface 101 spherical over 360°. The socket component 47 includes an inner surface 103 spherical over 360° and contacting the outer surface 101 of the ball device 49, thereby permitting the ball device 49 to pivot in any direction with respect to the socket component 47.

Figure 24:
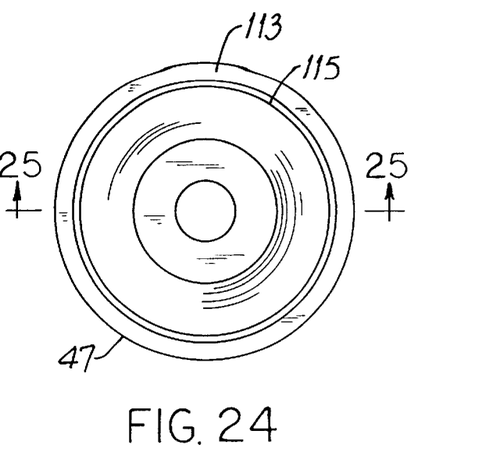
FIG. 24 is a top plan view of another embodiment of a socket component of the apparatus.
Figure 25:
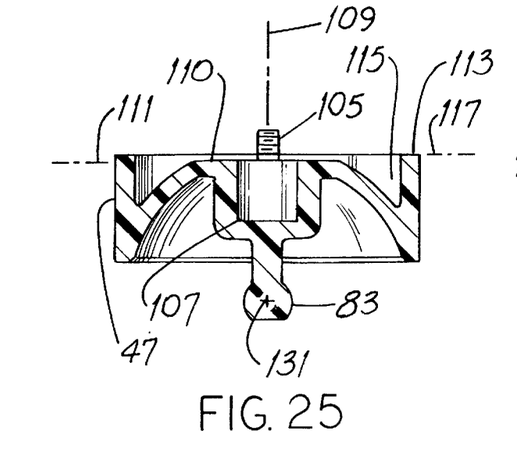
FIG. 25 is a section view of the socket component of FIG. 24 taken along the section plane 25—25 thereof.

Referring now to FIGS. 1, 24 and 25 in yet another embodiment, the apparatus 10 has a generally cylindrical socket component 47 which receives a stud 105 or other fastener in the pocket 107. To mount the level 11, the stud 105 and the tapped hole 23 shown in FIG. 1 are threaded to one another. The attachment pocket 107 is coincident with the component central axis 109 and the boundary 110 of the component is coincident with a pocket plane 111.

The socket component 47 also includes an annular bearing surface 113 spaced radially outwardly of the attachment pocket 107. The surface 113 and the pocket 107 are separated from one another by a groove 115 of generally V shape and such bearing surface 113 and the level 11 contact one another when the level 11 is mounted to the apparatus 10. Since the points of contact of the level 11 and the surface 113 are spaced well apart, the level 11 is better supported than if, say, the level 11 and the boundary 110 contact one another. The level-contacting bearing surface 113 is coincident with a bearing plane 117 and as indicated in FIG. 25, the planes 111, 117 are spaced slightly from one another.

(When molding plastic parts, it is very difficult to assure that two surfaces, e.g., the boundary 110 and the bearing surface 113, are always coincident with the same plane. The need to do so is obviated by configuring the socket component 47 so that the boundary 110 and the surface 113 are in the axially spaced relationship described.)

Figure 26:
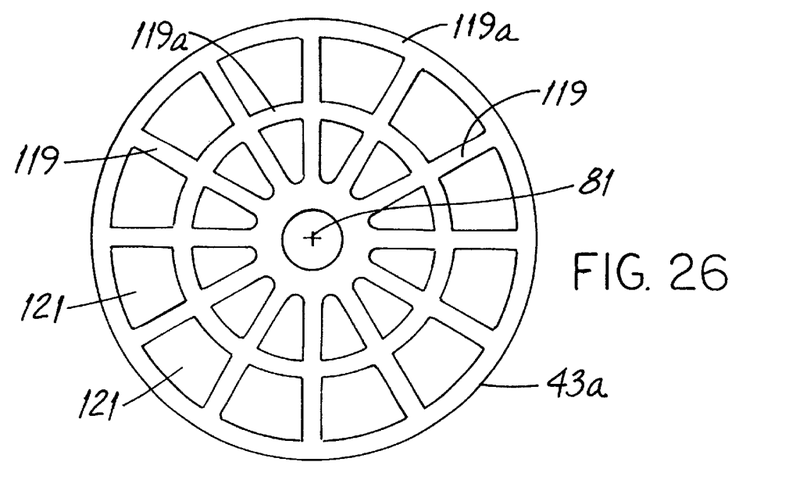
FIG. 26 is a bottom plan view of the base of the apparatus taken along the viewing axis VA26 of FIG. 27.
Figure 27:
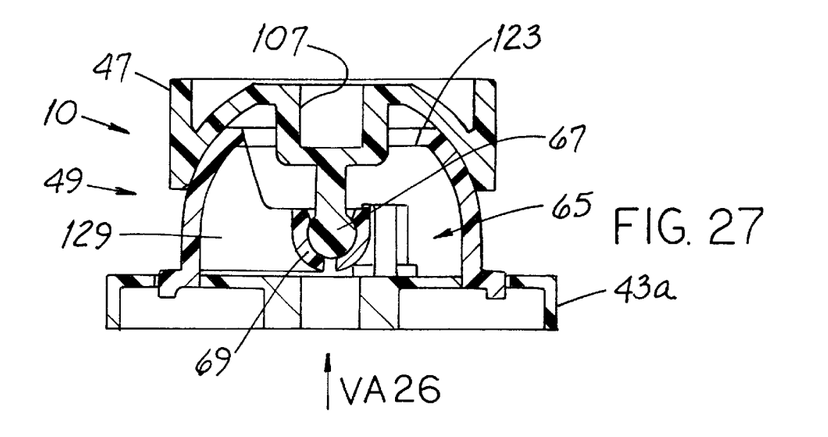
FIG. 27 is a section elevation view of yet another embodiment of the apparatus and with the ball device and socket component axially aligned with one another. Parts are omitted.

Referring particularly to FIGS. 26 and 27, a preferred levelling apparatus 10 is engineered to reduce the amount of plastic material that might otherwise be used in the molding process. Accordingly, the base 43a of the levelling apparatus 10 includes an underside having a plurality of ribs 119 and a plurality of between-rib cavities 121. In a specific embodiment, the ribs 119 extend radially outwardly from the axis 81 and, "wheel-like," are intersected by ribs 119a concentric with such axis.

Referring particularly to FIGS. 25 and 27–30, it is also preferable that the socket component 47 and the ball device 49 be cooperatively configured to permit the socket component 47 to tilt at some maximum angle of tilt with respect to the ball device 49—but no farther. To that end, the ball device 49 includes an annular lip 123 around the attachment pocket 125. When the axis 109 of the socket component 47 is coincident with the axis 127 of the ball device 49, the lip 123 is uniformly radially spaced outwardly from the attachment pocket 107 and is concentric with it. And at the maximum angle of tilt, shown in FIG. 28, the attachment pocket 107 contacts the lip 123.

Similar to the embodiment shown in FIGS. 21–23, the apparatus 10 has a retention mechanism 65 with first and second locking members 67, 69, respectively. In a specific configuration, such members 67, 69 are embodied as ball 83 and a clamping ring 85, respectively. Referring to FIGS. 27–30, the clamping ring 85 is supported by plural ribs 129 and the ball device 49 and the base 43a are sonic welded or otherwise affixed to one another. (The lever 93, shown in FIG. 21, is omitted from FIGS. 27 and 28.)

Figure 28:
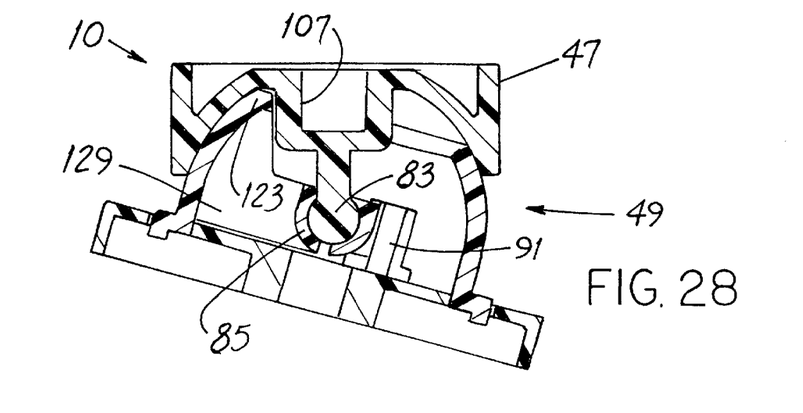
FIG. 28 is a section view generally like that of FIG. 27 and showing the socket component tilted with respect to the ball device. Parts are omitted.
Figure 29:
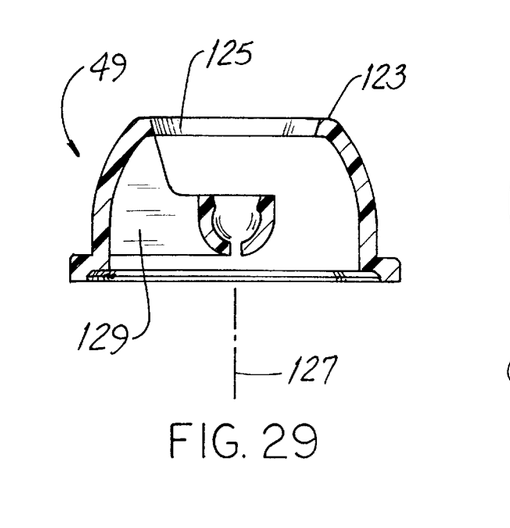
FIG. 29 is a section elevation view of another embodiment of the ball device used in the apparatus.
Figure 30:
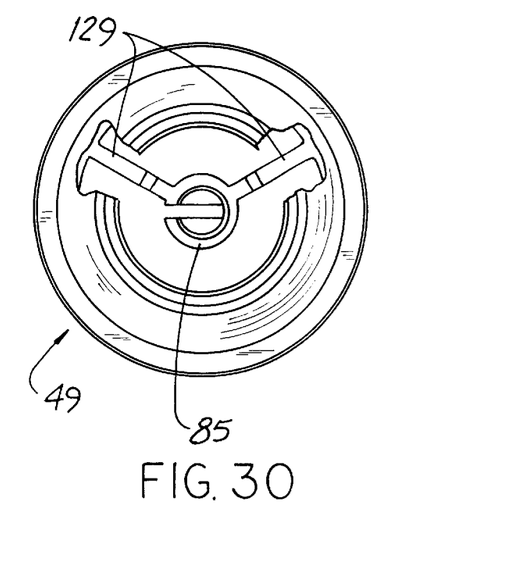
FIG. 30 is a top plan view of the ball device shown in FIG. 29. Parts are broken away.

Considering FIGS. 25, 27 and 28, it is to be noted that the ball 83 pivots with respect to a sphere center 131, the locus of which does not change. The socket component 47 also pivots with respect to the same sphere center 131. To explain it in other terms, the sphere center 131 is a common terminus of radii including the radius of curvature of the ball 83, the radius of curvature of the ball device 49, the radius of curvature of the socket component 47 and the radius of curvature of the clamping ring 85.

While the principles of the invention have been shown and described in connection with a few preferred embodiments, it is to be understood clearly that such embodiments are by way of example and are not limiting.

By way of definition, in the field of engineering mechanics, a body constrained so that its position can be specified by one coordinate is said to have a single degree of freedom of movement. Similarly, a body constrained so that its position can be specified by two coordinates is said to have two degrees of freedom of movement and a body, like the level 11 when mounted to an embodiment of the apparatus 10 disclosed herein, which may require three coordinates to specify its position is said to have three degrees of freedom of movement.

Terms such as "upper," "lower" and the like are used to denote position relationships as perceived by a viewer of the drawings which form a part of this specification. As applied to the component 47 or the device 49, the term "sphere-shaped" or "spherical" means that such component 47 or device 49 has a surface which defines a portion of a sphere (i.e., a surface which has a constant radius of curvature) or which has three points coincident with a sphere.

What is claimed:

1. A leveling apparatus for a laser level including:
   a base having a central axis;
   a sphere-shaped ball device fixed with respect to the base;
   a sphere-shaped socket component mounted to the ball device for relative, sliding movement with respect to such ball device; and
   a retention mechanism in registry with the central axis and including first and second locking members in overlapping relationship to one another, thereby selectively retaining the socket component in a fixed position with respect to the ball device, and wherein:
   the first locking member includes a single ball spaced from the ball device, and
   the second locking member includes a split clamping ring spaced from the socket component and contacting the ball; and wherein:
   when the clamping ring is tightened against the single ball, the position of the socket component is fixed with respect to the ball device.

2. The apparatus of claim 1 wherein:
   the ball is fixed with respect to the socket component; and
   a lever releases and tightens the clamping ring for releasable restraining movement of the ball.

3. The apparatus of claim 2 wherein:
   the socket component includes an axis;
   the first locking member includes a post fixed on the socket component, extending along the socket component axis and having a distal end; and
   the ball is affixed to the distal end.

4. The apparatus of claim 2 wherein:
   the clamping ring includes a tang extending away therefrom; and
   the lever is mounted for pivoting movement with respect to the base and has a bearing surface against the tang, thereby closing the clamping ring snugly against the ball.

5. The apparatus of claim 3 wherein:
   the clamping ring includes a tang extending away therefrom; and the lever is mounted for pivoting movement with respect to the base and has a bearing surface against the tang, thereby closing the clamping ring snugly against the ball.

6. The apparatus of claim 1 wherein:

the ball device includes a spherical outer surface; and the socket component includes (a) a spherical inner surface contacting the outer surface of the ball device, and (b) a post extending away from the spherical inner surface and having a post axis, and wherein:

movement of the socket component simultaneously moves the position of the post and its post axis.

7. The apparatus of claim 6 wherein the socket component includes:

an attachment pocket coincident therewith; and a level-contacting bearing surface spaced radially outwardly from the attachment pocket.

8. The apparatus of claim 7 wherein:

the attachment pocket has a boundary coincident with a pocket plane; and the level-contacting bearing surface is coincident with a bearing plane spaced from the pocket plane.

9. The apparatus of claim 6 wherein:

the base includes an underside having a plurality of ribs extending radially away from the base central axis and a plurality of between-rib cavities.

10. The apparatus of claim 6 wherein:

the socket component and the ball device are cooperatively configured to permit the socket component to tilt at an angle of tilt with respect to the ball device;

the socket component includes a central axis and an attachment pocket coincident therewith;

the ball device includes a lip around the attachment pocket, thereby limiting the angle of tilt.

* * * * *